March 31, 1964 — L. E. DE NEERGAARD — 3,127,592
STATIC PICKUP HEAD
Filed June 17, 1955 — 3 Sheets-Sheet 1
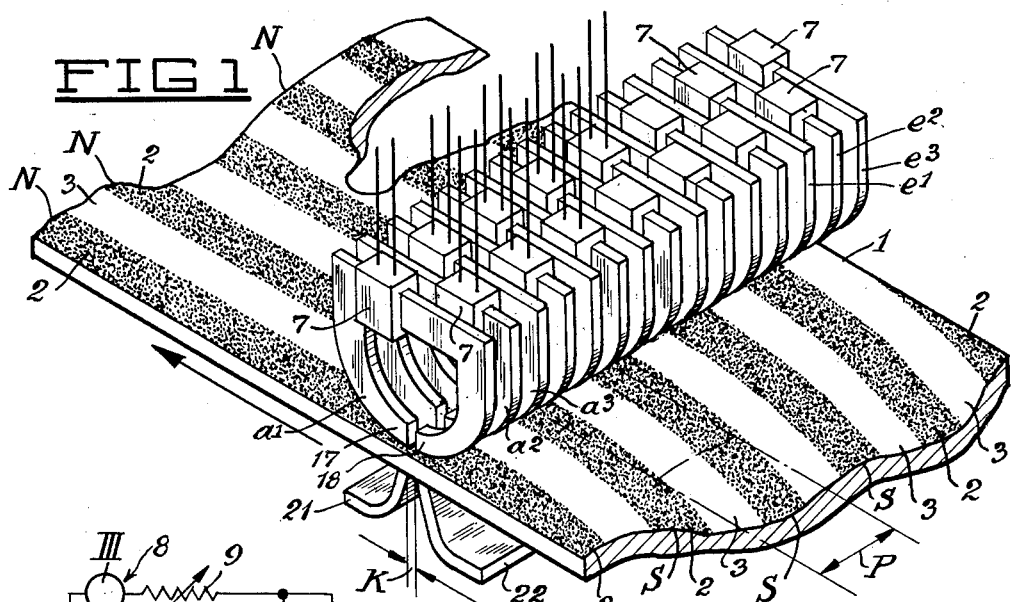
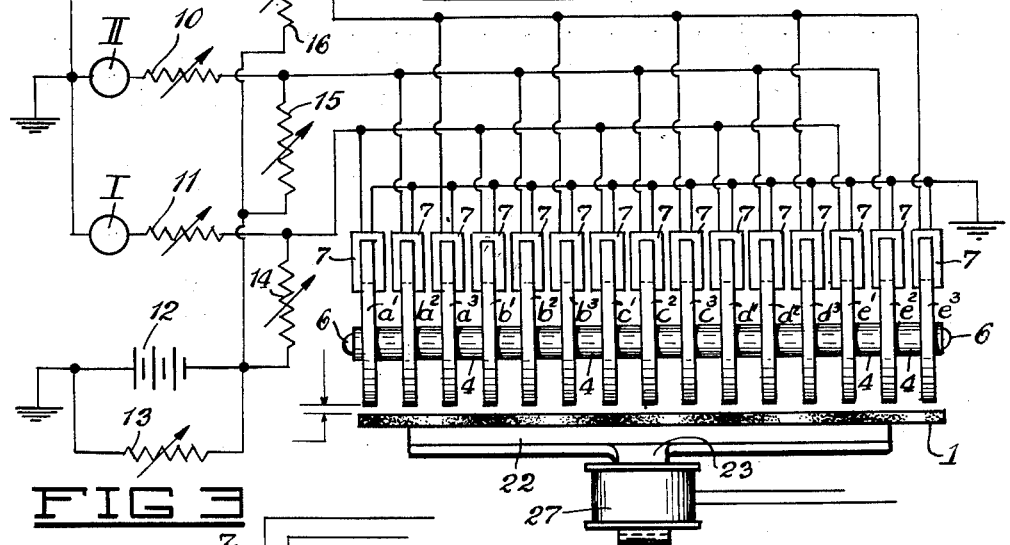
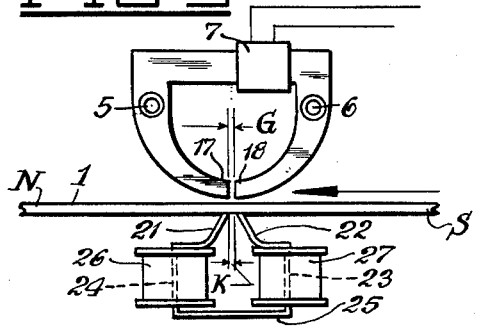
INVENTOR.
Leif Eric De Neergaard
BY Parker & Carter
Attorneys

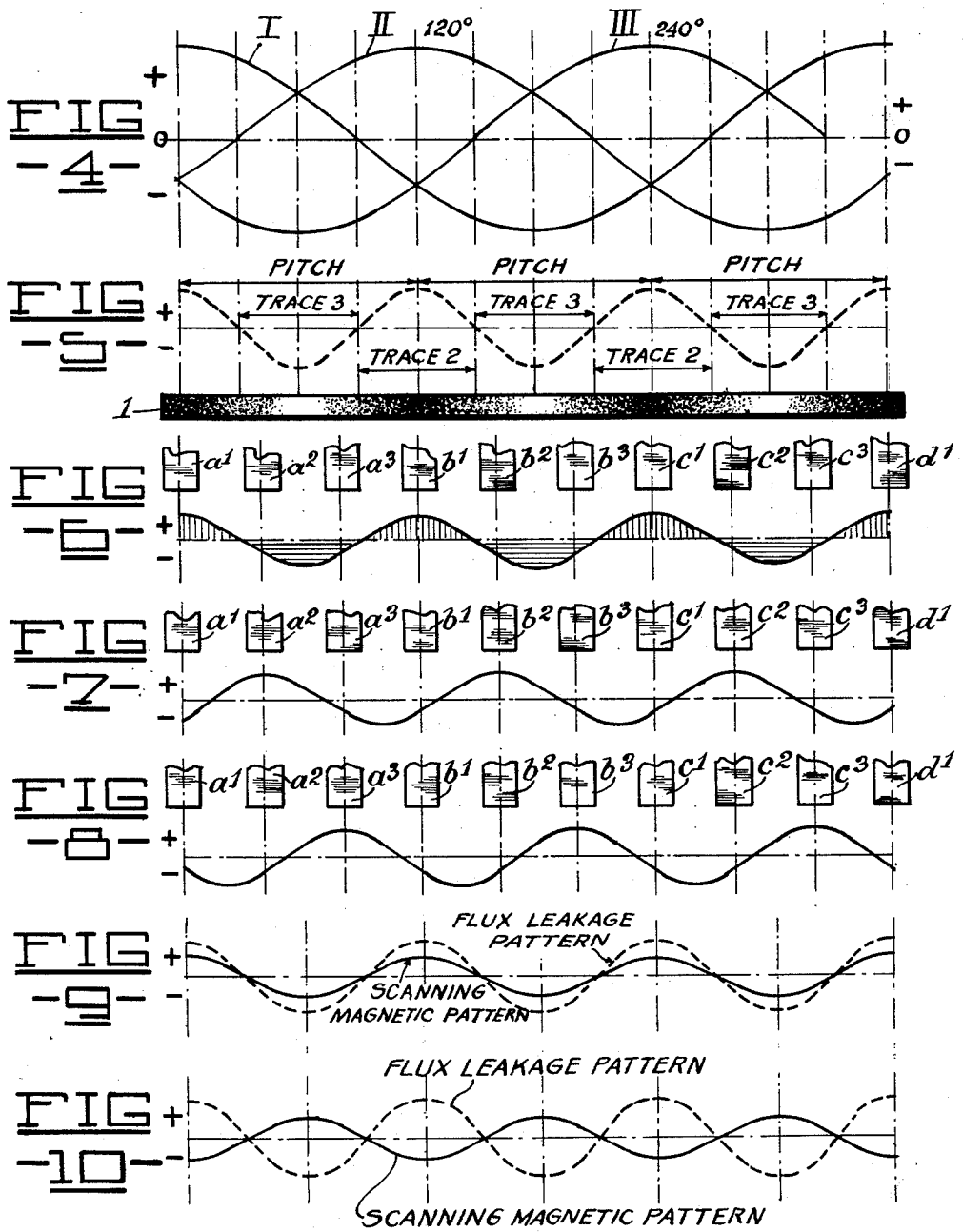

March 31, 1964  L. E. DE NEERGAARD  3,127,592
STATIC PICKUP HEAD
Filed June 17, 1955  3 Sheets-Sheet 3
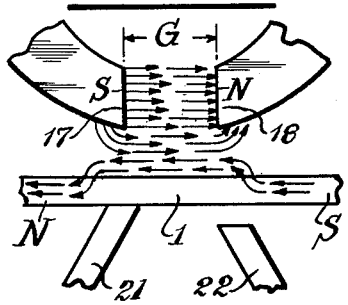
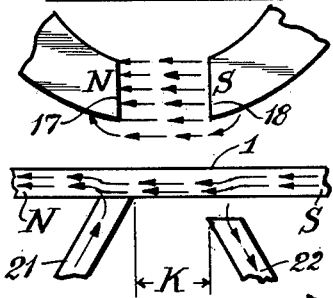
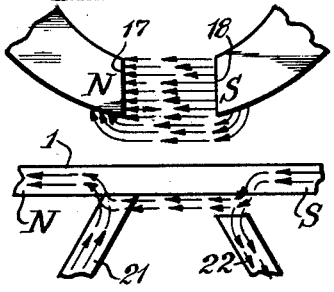
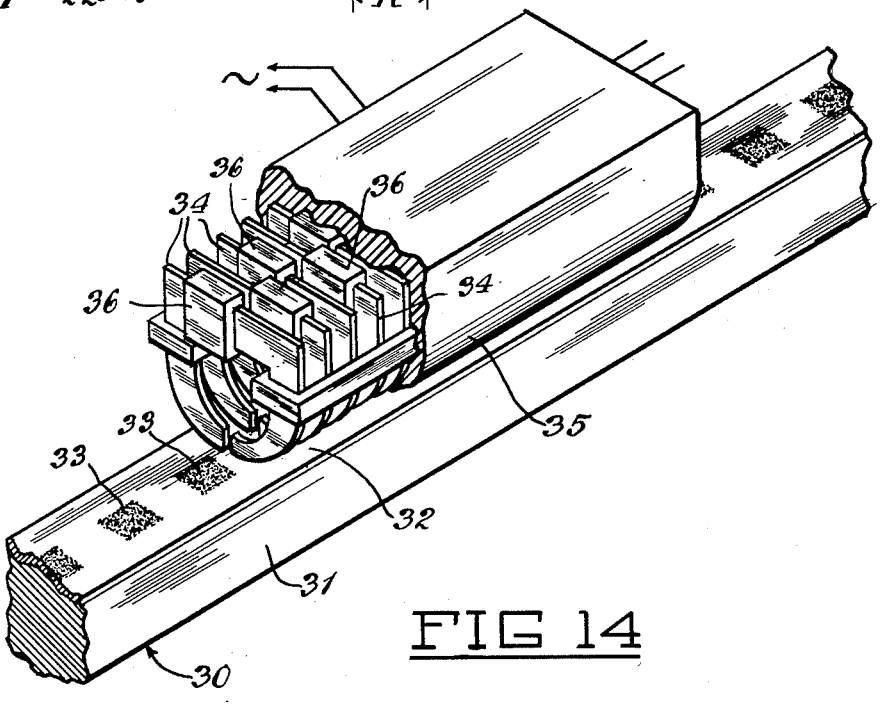
INVENTOR.
Leif Eric De Neergaard
BY
Parker & Carter
Attorneys

United States Patent Office 3,127,592
Patented Mar. 31, 1964

3,127,592
STATIC PICKUP HEAD
Leif Eric de Neergaard, Chicago, Ill., assignor to Frederic W. Olmstead, Washington, D.C., Hans W. Trechsel, Madison, Wis., Deryck A. Gerard, Minneapolis, Minn., John J. Kojis, St. Louis Park, Minn., Norman S. Parker, Evanston, Ill., and Malcolm S. Bradway, Chicago, Ill., and said de Neergaard as trustees; The Northern Trust Company, executor of said de Neergaard, deceased
Filed June 17, 1955, Ser. No. 516,177
10 Claims. (Cl. 340—174.1)

This invention pertains to transducers and more particularly to magnetic sensing or pickup devices adapted to convert certain displacement data magnetically impressed on signal storage members such as magnetized tape into utilizable signals. The herein described methods and means constituting my invention are particularly adapted to programmed servo control systems used in automatically controlling a machine tool or other fabricating device in a preselected manner.

The invention can also be used in the automatic control of one or more processing cycles encountered in power plants, oil refineries, pharmaceutical plants, breweries and the like. The devices herein disclosed can furthermore be used in transducers continuously sensing the precise positions of slidable or rotatable members such as tool-to-work and work-to-tool elements of machine tools or the exact position of such movable elements as armatures, rotors, bellows, diaphragms, etc., of various types of meters. Devices utilizing the herein disclosed methods and means can, along with many other uses, be incorporated in systems which translate certain mathematical data magnetically impressed on signal storage members into signals whose variations from instant to instant are precise indices of the recorded mathematical function.

In conventional systems for reproducing or picking up signals magnetically impressed on a signal storage member such as a magnetized tape it is essential that the tape be drawn past the pickup head at a certain minimum rate of linear velocity. This is essential in order that a minimum number of lines of magnetic flux (leaking from the magnetized areas impressed on the recorded tape) be cut per unit time by the stationary induction coil assembly.

The introduction of a variable reluctance pattern in the magnetic circuit of a magnetic pickup head makes it entirely possible to translate certain indicia suitably recorded on a storage member, such as a tape, into a very powerful signal whose magnitude is entirely independent of the rate that the tape is fed to the pickup assembly. Thus the tape can be static or fed at a rate of one or two inches per minute with absolutely no reduction in signal strength.

My application for U.S. Letters Patent, Serial No. 317,467, filed October 29, 1952, now Patent No. 2,882,516, discloses one type of variable reluctance path used in continuously scanning bauds or certain magnetized areas impressed on a storage member which are in register with a pickup assembly. In this disclosure certain spaced toothed or threadlike elements are arranged to continuously scan the magnetic areas. One type of structure giving very good results is a thread cylindrical member of "Mumetal" which is continuously rotated at a high angular rate to cause the threads to continuously scan certain spaced bauds or traces magnetically impressed on the signal storage member. These threads continuously "cut" the flux threading the induction coil structure in such a manner that a cyclically varying E.M.F. is generated in the coil whose frequency is identical to the rate that the threads scan the spaced bauds.

The just described type of mechanical scanner or flux modulator has certain limitations in certain applications. Since a mechanical type scanner utilizing a screw or equivalent structure must use a power source such as a synchronous motor to continuously drive the scanning element, the physical size of such a pickup can be too large for certain applications. Furthermore the rate that the scanning screw can be rotated and therefore the frequency that the spaced magnetic areas can be scanned is limited to the maximum speed that power elements such as small motors can be dependably operated.

Therefore, one of the objects of this invention is a magnetic pickup adapted to scan spaced magnetized areas or bauds at a very high frequency.

Still another object is to supply a species of magnetic sensing device or pickup which by virtue of scanning spaced magnetized areas or traces on a signal storage member with a magnetic variable reluctance pattern requires an extremely low footage or amount of magnetized storage member per unit time to perform any certain control cycle.

Another very valuable result obtained by the use of methods and means herein disclosed is the provision of magnetic pickups which are very small in size.

Yet another result subserved by the use of my invention is the provision of magnetic pickups incorporating flux modulating means which have no moving or wearing parts.

These and other highly valuable results are obtained by the use of a magnetic field which is caused to scan spaced magnetized traces, areas or bauds at a frequency proportional to the frequency of a split phase or polyphase alternating current. This frequency by design can be 5,000 c.p.s., 10,000 c.p.s. or in certain cases even higher if desired. This is of great importance in certain programmed servo systems since the position signal of the element being controlled is compared to the programmed signal at a rate proportional to the frequency of these two signals.

As an example, if a base frequency of 400 c.p.s. is used in a programmed servo system the secondary signal (indicating the position of the controlled element) will be compared to the primary or recorded signal 400 times per second. If, however, the base frequency is raised from 400 c.p.s. to 4,000 c.p.s., the rate of comparison will be increased ten times to vastly improve servo control.

By using high frequency in a programmed servo system the deviation of the frequency of the signals from the base frequency is less when expressed in percent of the base frequency. The automatic control of the saddle of a lathe can be taken as an example. Assume that a base frequency of 400 c.p.s. is used in the system and that the primary signal (generated or picked up from a magnetized tape or other form of storage member) is increased to +40 c.p.s. or 440 c.p.s. in order to move the saddle at a maximum velocity of 4″ per second in one direction and that this primary signal is decreased by −40 c.p.s. to the base 400 c.p.s. or to 360 c.p.s. to move the saddle at the same rate but in the opposite direction. The deviation of the signal from the base frequency of 400 c.p.s. is thus +40 and −40 c.p.s. Or expressed in percent of the base frequency the deviations are +10% and −10%.

However, if a base frequency of 4000 c.p.s. be used in the above system to control the saddle at the same rate the deviation of the signals expressed in percentage of the base frequency would be 4000/40 or +1%. Thus by using the higher frequency the total frequency deviation of the signals is only 1% above or below the base of 4000 c.p.s.

From the above it will be seen that very sharply tuned narrow band pass filters can be used in electronic amplifiers of programmed servo systems using high frequencies. In this manner a very large percent of unwanted signals can be excluded resulting in a very high signal to noise ratio.

As is well known a considerable unwanted phase shift may be imparted to a signal being amplified if its frequency changes over a wide band. The use of a high frequency signal in a servo system as pointed out reduces the total signal deviation to a very small percent of the base frequency. Due to the frequency band of such a system being extremely narrow it will be seen that unwanted phase shifts imparted to the signals during amplification will be very small.

Other objects will appear from time to time in the course of the ensuing specification and claims.

FIGURE 1 is a perspective view of one species of pickup constituting the invention. This figure also shows a broken length of tape serving as a storage member upon which certain displacement indicia has been magnetically impressed.

FIGURE 2 is a side elevation of the pickup represented in FIGURE 1 and illustrates the storage member in section;

FIGURE 3 is an end elevation of the pickup shown in FIGURES 1 and 2;

FIGURE 4 graphically represents one form of a polyphase signal used to energize certain windings of the pickup;

FIGURE 5 is intended to graphically represent the distribution of magnetic flux impressed on the storage member illustrated in FIGURES 1, 2 and 3;

FIGURE 6 illustrates the position of a linearly displaced magnetic field at a certain instant relative to certain flux producing elements;

FIGURE 7 is another illustration of the linearly displaced magnetic field taken at another instant;

FIGURE 8 is yet another graphical representation of the instantaneous magnetic field shown in FIGURES 6 and 7;

FIGURE 9 graphically illustrates the position at a certain instant of the linearly displaced magnetic field shown in FIGURES 6, 7 and 8 relative to the magnetic flux intensity pattern illustrated at FIGURE 5;

FIGURE 10 is another graphical representation of the two instantaneous magnetic intensity patterns depicted in FIGURE 9;

FIGURE 11 is intended to illustrate flux distribution occurring at the air gaps of certain elements at a certain instant of time;

FIGURE 12 illustrates the flux distribution shown generally in FIGURE 11 but at another instant;

FIGURE 13 is still another representation of the flux distribution illustrated by FIGURES 11 and 12; and FIGURE 14 is a perspective view of another species of magnetic pickup utilizing the methods and means of the instant invention.

Like characters designate like elements throughout the specification and drawings.

FIGURE 1 illustrates a species of signal generator or pickup incorporating means for producing a magnetic variable reluctance pattern used to continuously scan magnetized areas impressed on a data displacement storage member such as a magnetized tape 1. Only a broken section or length of tape 1 is illustrated in this figure.

The tape for descriptive purposes will be considered to be .002" thick, .500" wide and made of stainless steel selected for its special magnetic characteristics. The total length of the tape may vary from a few inches to a considerable footage dictated by the duration of a cycle the tape is to control in a programmed manner.

The width of the tape is occupied by a plurality of traces. Traces 2 which are magnetized are indicated by speckled shading. Traces 3 which appear unshaded in FIGURE 1 are to be considered unmagnetized areas. The width of each trace for simplicity of explanation is to be taken as .050". A pitch "P" shown on FIGURE 1 is two traces wide and therefore in this example equals .100".

The magnetized traces 2 can be considered to be magnetically impressed substantially along the length of tape 1 by longitudinal recording means. Thus these traces can be considered to be long bar magnets extending along the tape with their north poles oriented at the left hand end of the tape (as viewed in FIG. 1) and their south poles positioned at the opposite end of the signal storage member.

A stationary magnetic scanning head comprised of 15 identical spaced laminations $a^1$ to $e^3$, FIGURES 1 and 2, are mounted directly over tape 1. Each of the laminations may be made of thin Mumetal stock or similar material used in high grade magnetic structures. FIGURE 3 shows one form that each of these laminations may take. The gap "G" provided in each lamination serves as a high reluctance path for magnetic flux flowing from pole face 17 to pole face 18 of each lamination $a^1$ to $e^3$.

Three equally spaced laminations are provided per pitch "P," FIGURE 1.

Since the pitch "P" equals .100" the center distance between adjacent laminations would be .100/3 or .0333". Furthermore if the thickness of the stock from which the identical laminations are made is .0100" the space between adjacent laminations would be .0333"−.0100" or .0233".

The laminations $a^1$ to $e^3$ as indicated in FIGURE 2 are assembled into one unit by means of rivets 5 and 6 which extend through the laminations. The rivets are made of brass or similar non-magnetic material. Spacers 4 of like material serve to accurately space the laminations. An induction coil 7 comprised of many turns of magnet wire is wrapped around the upper horizontal element of each lamination. The coils are electrically and magnetically identical. Due to the small clearance between adjacent laminations it is advisable to stagger the positions of the coils 7 as shown in FIGURE 1.

A source of 3-phase alternating current is schematically indicated at I, II, and III in FIGURE 2. The source may be either a 3-phase alternator of conventional type, driven for example by a synchronous motor, or it may be an electronic source of 3-phase alternating current. Electronic means for generating a polyphase A.C. signal are preferable in many cases to a rotary alternator since an electronic source is readily capable of supplying a polyphase current of high frequency. The three separate outputs of the 3-phase generator 8 are identified by I, II and III in FIGURE 2. The magnitudes of the three separate phases should always be balanced. Furthermore the phase displacement between adjacent phases should always be exactly 120 electrical degrees.

A source of direct current in the form of a suitable battery 12 may be impressed upon the circuit between generator 8 and coils 7 as shown in FIGURE 2. Adjustment of direct current is effected by a variable resistance 13. Additional variable resistances 14, 15 and 16 are provided to separately adjust the magnitude of the direct current impressed on the coils 7 connected to the different phases I, II and III. Thus an adjustable direct current bias may be provided for the coils 7 of each phase.

Since certain laminations are magnetized by a certain phase of the 3-phase A.C. output of generator 8 they may be grouped. Thus laminations $a^1$, $b^1$, $c^1$, $d^1$ and $e^1$ can be alluded to as Group I since their separate coils 7 are all magnetized by phase I. Laminations $a^2$, $b^2$, $c^2$, $d^2$ and $e^2$ can be identified as Group II while laminations $a^3$, $b^3$, $c^3$, $d^3$ and $e^3$ can be collectively alluded to as Group III.

For purposes of description the frequency of the 3-phase A.C. output of generator 8 will be taken to be 4,000 c.p.s. A cyclically varying magnetic flux will therefore flow across the gaps "G" of the laminations $a^1$ to $e^3$ whose frequency will also be 4,000 c.p.s. Since the energizing current impressed on any lamination coil 7 is alternating it will be understood that the polarity of the pole faces 17 and 18 (FIG. 3) will change during each cycle. Thus at the beginning of a cycle the pole face 17 might be of north polarity with pole face 18 of opposite or south polarity. One half cycle or 180 electrical degrees later the polarity of pole face 17 changes to south while pole face 18 would be oppositely polarized. Obviously at the end of the cycle the polarity of the pole faces would be the same as at the beginning of the cycle.

FIGURE 4 graphically depicts the instantaneous magnitude and sign (+ or −) of the magnitude flux threading through each group of laminations per cycle. The time axis in this figure represents 1/4000 of a second if a 4000 cycle per second 3-phase A.C. is used for excitation of the coils 7.

As described in FIGURE 4 by the + and − signs the magnetic flux changes in sign as well as magnitude. At the extreme left hand side of the figure the sign and magnitude of the flux in Group I is + and 100% at the same instant the flux in Groups II and III is − and 50%. One third of a cycle or 120 electrical degrees later the sign and magnitude of the flux threading Group II will be + and 100% while the flux in Groups I and III will be − 50%. Study of the figure will indicate that two thirds of a cycle later or 240 electrical degrees from the start of the cycle the sign and magnitude of the flux in Group III will be + and 100% while the sign and magnitude of the flux in Groups I and II will be − and 50%.

FIGURES 6, 7 and 8 schematically indicate flux distribution immediately adjacent to the gaps "G" provided in the laminations making up Groups I, II and III. For the purpose of economy of space only 3 laminations per group are indicated. From FIGURE 6 it will be seen that the sign and magnitude of the flux in Group I (comprised of laminations $a^1$, $b^1$, $c^1$ and $d^1$) is at one instant + and 100%. At the same instant the sign and magnitude of the flux threading Group II (consisting of laminations of $a^2$, $b^2$, and $c^2$) and Group III (comprised of laminations $a^3$, $b^3$ and $c^3$) is − and 50%.

FIGURE 7 indicates the flux distribution adjacent to gap "G" one third of a cycle or 120 electrical degrees later. It will be noted that the magnetic pattern has shifted from the position shown in FIGURE 6 in a left to right direction a distance of 120 electrical degrees or by 1/3 pitch. This shift of the magnetic pattern is due of course to the sign and magnitude of the flux threading Group II gradually changing from a negative 50% to a positive 100%.

FIGURE 8 illustrates the flux distribution 1/3 of a cycle later, where maximum positive flux has shifted 1/3 of a pitch to the right.

From these figures it will be seen that the flux distribution at any time substantially takes the form of a sine wave extending across the magnetic areas or traces.

Sinusoidally varying the flux in the laminations of Groups I, II and III by impressing phase I on the coils 7 of Group I, phase II on the coils of Group II and phase III on Group III thus produces a moving magnetic field which can be represented as having a definite sine wave form which moves transversely across the magnetized areas on the record.

Since there are 3 laminations per pitch "P" each magnetized by a separate phase of the 3-phase A.C. impressed on their coils 7 it will be seen that the magnetic pattern will be displaced from left to right at the rate of 1 pitch "P" per cycle and in a direction transverse to the axis of tape 1. If the frequency of the 3-phase A.C. is 4000 c.p.s. each trace 2 and 3 impressed along the length of tape 1 will be scanned by the magnetic pattern at the rate of 4000 times per second. Obviously the traces would be scanned by the pattern 10,000 times per second if the frequency of the 3-phase A.C. impressed on the coils 7 was 10,000 c.p.s.

In FIGURE 5, the tape 1 is shown in cross-section. The dark areas represent the traces and the magnetic intensity of the recorded traces. The intensity is graphically represented above the record by the broken line.

In this figure it will be seen that the peaks of the graph, or the points of maximum intensity occur over the centers of the traces 2 extending along the record 1.

A magnetic structure, FIGS. 1, 2 and 3, including spaced flux collectors 21 and 22 having portions 23 and 24 passing through induction coils 26 and 27, and a bight portion 25 connecting portions 23 and 24 is positioned adjacent to the record 1 opposite to the stationary laminations $a^1$ to $e^3$. The collectors 21 and 22 terminate closely adjacent to the record but have a free gap between them which extends transversely to the record. Magnetic flux from the areas on the record 1 may thus pass to this magnetic structure. The moving regulating field heretofore described serves to cyclically vary the flux in this circuit and thereby induce a varying voltage in the coils 26 and 27.

If the storage member 1 is removed, the air gap whose length is "K" (FIGURE 3) and whose width equals the length of the flux collectors or .400″ would be continuously scanned by the magnetic pattern in a direction from left to right as viewed in FIGURE 2 and at a rate of 4000 c.p.s. Since the distance or gap between the upper scanning and lower pickup structures (normally occupied by the tape) is very small it will be seen that considerable flux from this magnetic pattern will be absorbed by the upper edges of the flux collectors resulting in the flow of flux through the Mumetal magnetic loop of the pickup structure. However, no cyclically varying signal will be generated by the windings of the coils 26 and 27 since the algebraic sum of all the flux threading the magnetic loop from instant to instant will equal zero. FIGURE 6 illustrates the areas representing the magnitude of flux of one polarity by vertical cross hatching and the area representing flux of opposite polarity by horizontal cross-hatching. From this figure it will be seen that the areas representing flux of one polarity exactly equal the areas representing flux of opposite polarity. Thus at any instant the flux of one sign is exactly cancelled by the flux of opposite sign.

Now assume that the coils 7 of the scanning head are de-energized with the tape 1 in operating position as shown in FIGURES 1, 2 and 3. The under surface of tape 1 is adjacent to the parallel edges of flux collectors 21 and 22. The traces 2 as stated are longitudinally recorded with their north poles oriented at the left hand end of the tape 1 and with their south poles at the opposite tape end as indicated by FIGURES 1 and 3. The gap "K," FIGURE 3, can be considered as being bridged by four separated bar magnets (formed by the magnetic areas or traces) each of whose length is "K."

From the above it will be seen that flux will flow from the south pole of each of the four magnets through flux collector 22 in a clockwise direction as viewed in FIGURE 3 through the magnetic structure of the pickup to the north poles of the magnets adjacent to the upper edge of flux collector 21. No signal would be produced in the induction coils however since the path of the flux would be unidirectional.

Before describing operation of the instant signal generator attention is called to FIGURES 9, 10, 11, 12 and 13. FIGURES 9 and 10 schematically represent the imposition of the scanning magnetic pattern (illustrated in FIGURES 6, 7 and 8) on the pattern of the leakage flux from the magnetized traces 2 and unmagnetized traces 3 impressed along the length of tape 1. This latter pattern is illustrated above the cross section of tape 1 in FIGURE 5.

FIGURE 9 shows the instantaneous position of the scanning magnetic pattern (represented in solid outline) in exact phase with the pattern of leakage flux from the tape which is shown in broken outline. FIGURE 10 represents the phase relation of the two patterns one-half cycle later and indicates the phase relationship is 180 degrees.

FIGURES 11, 12 and 13 are studies of the distribution of magnetic flux generated at certain instants by sinusoidally varying the exciting current energizing a coil 7 mounted on any lamination. For purposes of description, it will be assumed that these figures illustrate the pole faces 17 and 18 of any lamination in Group I (comprised of laminations $a^1$, $b^1$, $c^1$, $d^1$ and $e^1$, FIGURE 2) only the lower ends of the lamination is shown. FIGURES 11, 12 and 13 also illustrate the pattern of the leakage flux from a small length of tape 1 and the distribution of this flux in the magnetic loop of the pickup structure at certain instants. It will be assumed for purposes of description that the specific lamination shown in these figures is located over the exact center of one of the magnetized traces 2 impressed on tape 1.

It should be understood the sinusoidally varying magnetic pattern graphically illustrated in solid outline in FIGURES 6 to 10 actually represents the magnitude and direction of flow of flux between all of the pole faces 17 and 18. FIGURE 11 is intended to graphically indicate the magnitude and direction of flux flowing between the pole faces of laminations $a^1$, $b^1$, $c^1$, $d^1$ and $e^1$ (FIGURE 2) constituting Group I when this flux is of maximum magnitude and of plus polarity. See FIGURES 6 and 9. FIGURE 12 is intended to indicate the magnitude and direction of flow of flux between the pole faces one-third of a cycle later. FIGURE 13 depicts the flux distribution when the magnitude of the flux is at maximum again but of negative polarity.

Due to the fact that there are a plurality of laminations spaced varying distances from each particular trace on the control member, the regulating effect of the field produced by the laminations will be greatest in the case of that lamination which is positioned directly over or nearest to a trace. Thus considering laminations $a^1$, $a^2$, and $a^3$ with relation to the trace 2 at the left-hand side of the control record in FIGURE 2, it will be seen that the regulating effect of the lamination $a^1$ will be greater than the regulating effect of laminations $a^2$ and $a^3$. Thus the field or flux created by the laminations $a^1$, $a^2$ and $a^3$ will have a varying effect on the trace and the same will be true of the other laminations with respect to the other traces. This variance in regulating effect will vary the flux passing through the flux collectors 21 and 22 and thus induce a cyclic signal in the coils 26 and 27. If the frequency of the voltage supplied to the laminations is 4000 cycles per second the signal induced in the coils 26 and 27 will be 4000 cycles per second.

According to one embodiment of the invention, the laminations may act as a shunt to divert flux from the traces on the record. In such a case, the variable resistors 14, 15 and 6 are adjusted in a manner such that the laminations operate in the knee region of their saturation curve. Thus uniform changes in current supplied to the coils surrounding each of the laminations bring about uniform changes in permeability of the elements. As the elements change in permeability, they change in their capacity to absorb flux from the traces.

According to another embodiment of the invention, the laminations are operated in a manner such that they alternately suppress and reinforce the flux established between the traces on the record and the flux collectors 21 and 22. In this embodiment, the changes in permeability are unimportant. This embodiment is illustrated in FIGURES 11, 12 and 13. In these figures, the poles 17 and 18 of a typical lamination are illustrated in their position above the record 1. The flux collectors 21 and 22 are illustrated beneath the record. In FIGURE 11, pole 17 is illustrated as a south pole and pole 18 is illustrated as a north pole and the arrows between these poles illustrate the path of flux therebetween. If the traces on the record are longitudinally recorded in a manner such that the north pole of the traces may be assumed to be at the left and the south pole at the right, the flux between the poles 17 and 18 will tend to attract the flux from the traces with the result that a minimum of flux is esablished through the flux collectors 21 and 22.

FIGURES 12 and 13 illustrate the pole pieces 17 and 18 a portion of a cycle later when pole 17 has become a north pole and pole 18 has become a south pole. FIGURE 12 is intended to illustrate this condition when the current between the poles is less than a maximum and FIGURE 13 illustrates this condition when the current is at a maximum. In FIGURES 12 and 13 it will be seen that flux created between the poles 17 and 18 tend to repel the flux from the record and thus maximum flux may be established through the flux collectors 21 and 22. Maximum flux is illustrated in FIGURE 13 when the repelling effect of the poles 17 and 18 is at a maximum. Thus it will be seen that as the poles 17 and 18 change in polarity in a cyclic manner, the flux established through the flux collectors 21 and 22 will vary in a cyclic manner. In this embodiment of the invention the several laminations adjacent to any one trace will have varying degrees of regulating effect on the flux established between the magnetized area and the flux collector due to the varying distances between the individual laminations and the trace.

In each form of the invention, a magnetic field is established over each area which has its point of maximum flux varying intensity moving transversely to the trace or area in a cyclic manner such as is illustrated in FIGURES 6, 7 and 8. This point moves toward and away from the trace or area continuously. Thus I obtain a scanning action for the traces with the use of a stationary or static scanning head. If the traces are displaced with respect to the direction of movement of the record, the effect produced is that of a phase shift in the signal induced in the coils 26 and 27. Thus if the voltage supplied to the laminations or flux regulating elements is at a frequency of 4000 cycles per second and the traces are displaced on the record in a manner such that they move to the right (as seen in FIGURE 2) at the rate of one pitch per second, the signal induced in the coils 26 and 27 will undergo a phase shift of 360 electrical degrees. If the displacement of the traces is such as to produce a relative movement from left to right at the rate of one trace per second and the scanning action takes place in a direction from left to right (as seen in FIGURE 2) the resultant frequency will be 3999 cycles per second. Conversely, if the traces are displaced right to left (as seen in FIGURE 2) at a constant rate of one pitch per second, the resultant frequency will be 4001 cycles per second. Thus I obtain a phase shift in electrical degrees which is proportional to the amount of relative transverse movement of the traces with respect to the flux regulating members per unit time.

The principles of the invention may be employed with a secondary signal generator. I have illustrated the application of the invention to such a device in FIGURE 14. In FIGURE 14 an elongated meter bar is designated at 30. The meter bar is shown as including a relatively rigid backing member 31, the upper surface of which carries an elongated magnetic storage member 32. The storage member 32 may be similar, in terms of its magnetic characteristics to the one illustrated in FIGURE 1. The storage member 32 however, has a plurality of equally spaced magnetic bauds 33 impressed thereon throughout the length thereof. These bauds are spaced according to a predetermined unit of linear measurement. They may be spaced (for purposes of description) at a pitch corresponding to the pitch of the traces illustrated in FIGURE 1. These bauds, however, may be longitudinally recorded so that their theoretical north and south poles are spaced transversely of the storage member. A plurality of laminations similar in all respect to the laminations illustrated in FIGURE 1 are designated generally at 34 and are spaced along the length of the storage member 32. When used with this form of signal generator, the laminations may include an insulating housing 35 which is broken away to illustrate the spacing of the laminations. Each of the laminations is provided with a coil 36, similar to those in FIGURE 1, and the coils of the several laminations are supplied with polyphase current as is the case with the laminations illustrated in FIGURES 1 and 2. Flux collectors and an induction coil structure may be positioned interiorly of the laminations in this figure. In this figure, the scanning action may take place from left to right as is the case with the scanner illustrated in FIGURE 2 and thus produce a cyclic signal. Movement of the bauds 33 with respect to the laminations in a direction parallel to the length of the meter bar will produce a phase shift in the induced signal in a manner similar to the phase shift produced in FIGURES 1 and 2.

In lieu of having the flux collectors and induction coils positioned interiorally of the laminations, the flux collectors and induction coils may be positioned beneath the storage member 32 (in a manner similar to FIGURE 1) so as to have the gap between the flux collectors extending parallel to the length of the storage member 32. In such an instance, the backing member 31 may be dispensed with and the storage member 32 may be supported under tension so as to maintain it in generally a single plane.

In each form of the invention, I employ a static or stationary pickup head which scans a plurality of equally spaced bauds or magnetized areas in a cyclic manner. By scanning a plurality of the bauds or magnetic areas, I obtain an averaging effect for the signal induced in the induction coils. Furthermore the degree of movement of the magnetized areas in a direction parallel to the direction of scanning is unlimited. Thus a distance of 10, 15 or 20 feet may be represented in terms of a similar displacement of the traces on the control record or may be represented by a correspondingly sized elongated meter bar. This distance is broken up into increments with each increment related to a 360-degree phase shift of a cyclic signal.

The structure illustrated may also be employed to record displaced traces which may represent desired displacements of a machine tool element or the magnitude of a physical quantity. In such a case, the polyphase signal is supplied to the groups of elements $a^1$ through $e^3$ as in the case of generating the signal. In lieu of inducing a signal in the coils 26 and 27, these coils are supplied with a cyclic signal, the phase of which will be varied with the direction and rate of movement being recorded. This signal may be supplied from phase shifting signal generators of the type herein described where a linear movement of a member is translated into a phase displacement.

If the signal supplied to the elements and that supplied to the coils 26 and 27 have the same frequency, the magnetized areas, which result on the record, will be parallel to the direction of movement of the record. When the signal supplied to the coils 26 and 27 varies in phase in response to the input of information relating to rates and directions of movement the traces or magnetized areas will be displaced in one direction or the other relative to the direction of movement of the record at a rate corresponding to the rate of phase change in the signal supplied to the coils 26 and 27.

The relative magnetic strength of the magnetized areas or traces as compared to the areas between the traces results from the combined action of the field created by the elements and the phase relations of the two.

Whereas I have shown and described an operative form of my invention, I wish it to be understood that this showing is to be taken in a diagrammatic or illustrative sense only. There are many modifications to the invention which will fall within the scope and spirit of the invention and which will be apparent to those skilled in the art.

For example, the number of elements provided in each group of regulating elements may be varied as long as the same number of elements are provided in each group, and as long as the current supplied to the elements is varied in a polyphase relation according to the number of elements in each group. Thus if six elements are employed in each group, a six-phase signal must be supplied to the respective elements, with adjacent elements being sequentially and uniformly out of phase with each other.

Also Silicon steel may, under some circumstances, be used in place of Mumetal or other metal having high permeability to low flux densities.

Another possible modification is found in the position of the regulating structure. The precise position with respect to the flux collectors 21 and 22 is not critical as long as the elements are so positioned as to regulate in a cyclic manner the flux changes in the flux collectors to thereby generate a cyclic output signal in the coils 26 and 27.

The scope of the invention should be limited only by the scope of the hereinafter appended claims.

I claim:

1. A pickup assembly for use with magnetic storage members including a magnetic storage member having an area thereon of predetermined magnetic characteristics and adapted to emit flux, means establishing a flux path from said magnetic storage member to an induction element, and means for varying in a cyclic manner the flux in said path including a plurality of spaced flux conductive members positioned adjacent said path, one of said flux conductive members being nearer to said area than the others, and means for supplying a cyclically varying voltage to each of said flux conductive members with the voltage supplied to each individual member being out of phase with the voltage supplied to the others.

2. A pickup assembly for use with magnetic storage members including a magnetic storage member having an area thereon of predetermined magnetic characteristics and adapted to emit flux, means establishing a flux path from said magnetic storage member to an induction element, means for varying in a cyclic manner the flux in said path including a plurality of spaced flux regulating members positioned adjacent to said path, one of said flux regulating members being nearer to said area than the others, means for supplying a cyclically varying voltage to each of said members with the voltage supplied to each individual member being out of phase with the voltage supplied to the others, and means for varying the position of said magnetized area of the magnetic storage member with respect to said flux regulating members.

3. An assembly as set forth in claim 2 wherein said magnetic storage member is in the form of an elongated record and said area is formed as a generally elongated trace which has a varying inclination with respect to the edge of the record.

4. An assembly as set forth in claim 2 wherein said magnetic storage member is elongated and linearly extending, and said flux regulating members are spaced along a predetermined length of said member.

5. A pickup assembly for use with magnetic storage members including a magnetic storage member having a plurality of equally spaced areas thereon, said areas having predetermined magnetic characteristics and adapted to emit magnetic flux, means establishing a flux path from said magnetized areas to an induction element, a plurality of flux regulating members positioned adjacent to said magnetized areas and to said flux path, there being a plurality of said flux regulating members positioned adjacent each of said areas, means for supplying a cyclic varying voltage to each of said flux regulating members thereby creating a cyclically varying magnetic field over said magnetized areas, the voltages supplied to adjacent flux regulating members being out of phase with one another, and means for varying the position of said magnetized areas with respect to said flux regulating members.

6. The method of generating a cyclically varying signal from a magnetized area on a magnetic storage member, including the steps of establishing a flux path from the magnetic area on the magnetic storage member to an induction element, varying the flux in said flux path by imposing a cyclically varying magnetic field on said magnetic area, continuously varying the intensity of said magnetic field in a direction toward and away from said magnetic area and thereby varying the flux to said induction element, and producing a phase shift in said induction element by moving said magnetic area with relation to said magnetic field.

7. A signal generating assembly including an elongated magnetic storage member having a plurality of equally spaced magnetized areas impressed thereon, an induction element magnetically associated with said areas, and a flux regulator including a plurality of separate, stationary permeable elements positioned adjacent each area, and means for varying the permeability of each element associated with each area in polyphase relation.

8. A flux modulating assembly including a lineally extending member having a series of equally spaced areas thereon having predetermined flux characteristics, said areas being separated by a second series of equally spaced intermediate areas having different flux characteristics, and means for continuously and uniformly scanning the series of areas including a plurality of stationary uniformly spaced flux regulating members opposite at least some of the areas, the spacing of the flux regulating members relative to the spacing of the areas being such that at least one of the regulating members is generally opposite and associated with each of the areas in both series, means for establishing a cyclically varying flux field in the regulating members, and means for producing relative movement between the regulating members and the lineally extending member.

9. The structure of claim 8 further characterized in that the areas of the lineally extending member have magnetic flux characteristics.

10. A transducer for use with a magnetic storage member, comprising flux conducting means in flux transmitting relationship with said storage member to establish a primary flux circuit, an induction device in inductive relationship with the flux conducting means and the primary flux circuit established thereby, a scanning device opposite and associated with the flux conducting means including a plurality of stationary, uniformly spaced flux regulating members, and means for establishing a cyclically varying flux field in the regulating members with the flux in any one member being out of phase with the flux in the adjacent members.

References Cited in the file of this patent
UNITED STATES PATENTS

| | | |
|---|---|---|
| 1,912,167 | Anderson | May 30, 1933 |
| 2,567,812 | Hickman | Sept. 11, 1951 |
| 2,628,539 | De Neergaard | Feb. 17, 1953 |
| 2,641,656 | Dicke | June 9, 1953 |
| 2,698,427 | Steele | Dec. 28, 1954 |
| 2,700,703 | Nordyke | Jan. 25, 1955 |
| 2,704,789 | Kornei | Mar. 22, 1955 |